(12) United States Patent
Weijer

(10) Patent No.: US 6,352,002 B1
(45) Date of Patent: Mar. 5, 2002

(54) SOIL PROBING DEVICE WITH OPTICAL DATA TRANSMISSION

(75) Inventor: George Weijer, Mantgum (NL)

(73) Assignee: Verenigde Bedriiven Van den Berg Heerenveen Holding B.V., Heerenveen (NL)

( * ) Notice: Subject to any disclaimer, the term of this patent is extended or adjusted under 35 U.S.C. 154(b) by 0 days.

(21) Appl. No.: 09/603,001

(22) Filed: Jun. 26, 2000

(30) Foreign Application Priority Data

Jun. 29, 1999 (NL) ............................................ 1012468

(51) Int. Cl.⁷ .............................. G01N 1/00; G01N 3/48
(52) U.S. Cl. .......................................... 73/864.74; 73/81
(58) Field of Search ................................ 73/73, 81, 83, 73/85, 864.74, 864.73

(56) References Cited

U.S. PATENT DOCUMENTS

| 4,266,878 A | * | 5/1981 | Auer ........................... 356/419 |
| 4,445,788 A | * | 5/1984 | Twersky et al. ............. 374/142 |
| 4,762,991 A | * | 8/1988 | Timmerman et al. ........ 250/277 |
| 4,807,707 A | * | 2/1989 | Handley et al. ............... 175/20 |
| 5,128,882 A | | 7/1992 | Cooper et al. |
| 5,706,892 A | | 1/1998 | Aeschbacher, Jr. et al. |
| 5,739,536 A | * | 4/1998 | Bucholtz et al. ......... 250/341.2 |
| 5,804,713 A | | 9/1998 | Kluth |
| 5,902,939 A | | 5/1999 | Ballard et al. |

FOREIGN PATENT DOCUMENTS

| EP | 0 645 646 A1 | 3/1995 |
| WO | WO 99/23355 | 5/1999 |

\* cited by examiner

*Primary Examiner*—Max Noori
(74) *Attorney, Agent, or Firm*—Hoffmann & Baron, LLP

(57) ABSTRACT

A soil probing device comprises a probing rod which is assembled from a plurality of linkable rod sections and, while being pushed into the soil, is extended each time by one or more rod sections. The device further comprises a measuring probe which is fitted to the probing rod to obtain regarding the soil. The device also comprises a data transmitter that is designed for transmission of data between the measuring probe and a location at or near the soil surface. Each rod section is provided with an optical guide section extending between its ends in such a way that linking such rod sections results in the formation of a continuous optical guide within the probing rod.

13 Claims, 2 Drawing Sheets

SOIL PROBING DEVICE WITH OPTICAL DATA TRANSMISSION

FIELD OF THE INVENTION

The present invention relates to a soil probing device. The present invention also relates to a method for performing a soil probing operation using such a soil probing device.

BACKGROUND OF THE INVENTION

U.S. Pat. No. 5,902,939 discloses a soil probing device with a plurality of linkable rod sections for the assembly of a probing rod, which probing rod, while being pushed into the soil, is extendable each time by one or more rod sections. The probing device for example is provided with a clamp which grips the rod and can be pushed downwards by one or more associated hydraulic cylinders. While the probing rod section is being linked up, the process of pushing the probing rod into the soil can be temporarily stopped, but the probing process is preferably continued without interruption.

The known soil probing device further has a measuring probe which is fitted to the probing rod and is provided with measuring means to obtain data regarding the soil. The measuring probe can, for example, be a penetrometer comprising a cone for measuring the cone resistance, a friction sleeve for measuring side friction, and optionally sensors for measuring other parameters such as, for example, probe inclination, equilibrium water pressure, etc. Alternative designs of the probe are also possible, however.

The known soil probing device further has data transmission means which are designed for transmission of data between the measuring probe and a location at or near the soil surface.

In the known probing device the measurement data are transmitted from the probe via a umbilical cable running through the rod sections linked together from the measuring probe to the processing and recording apparatus at the surface. One or more fiber optical cable may form part of this umbilical cable for the optical transmission of measurement date. The use of such a continuous cable is inconvenient, however, when the rod sections are being linked up.

In the case of another known solution, the transmission of the data obtained by the measuring probe is effected acoustically, acoustic signals propagating through the material of the probing rod. The most important drawback of this solution is that the transmitted signal includes a great deal of noise, especially due to machinery, vehicles, etc. present in the vicinity of the probing operation, thus hampering processing and analysis of the measured signals.

SUMMARY OF THE INVENTION

It is an aim of the present invention to overcome the abovementioned drawbacks.

The present invention achieves this aim with a soil probing device, wherein each rod section of the probing rod is provided with an optical guide section extending essentially between the ends of the rod section so that linking these rod sections results in the formation of a continuous optical guide within the probing rod.

Surprisingly, the fact that the optical guide is assembled from a plurality of axial sections, with a junction between each section and the next section, is found not to present a problem. This arrangement is found to work even in a very simple embodiment in which the rod sections are attached to one another, for example by means of screw threads, and the heads of the optical guides in those rod sections come to lie close together or against one another without further linking means. Another advantage is that the optical guide itself and the transition of the optical signals from the one guide section to the other guide section are largely insensitive to moisture, in particular much less sensitive than any electrical cable and connections. Given that the probing operation often involves working under damp conditions and below the groundwater level, this is an important practical advantage.

Further advantageous embodiments of the soil probing device according to the invention are described in the following description.

DETAILED DESCRIPTION AND OPERATION

Figure 1:
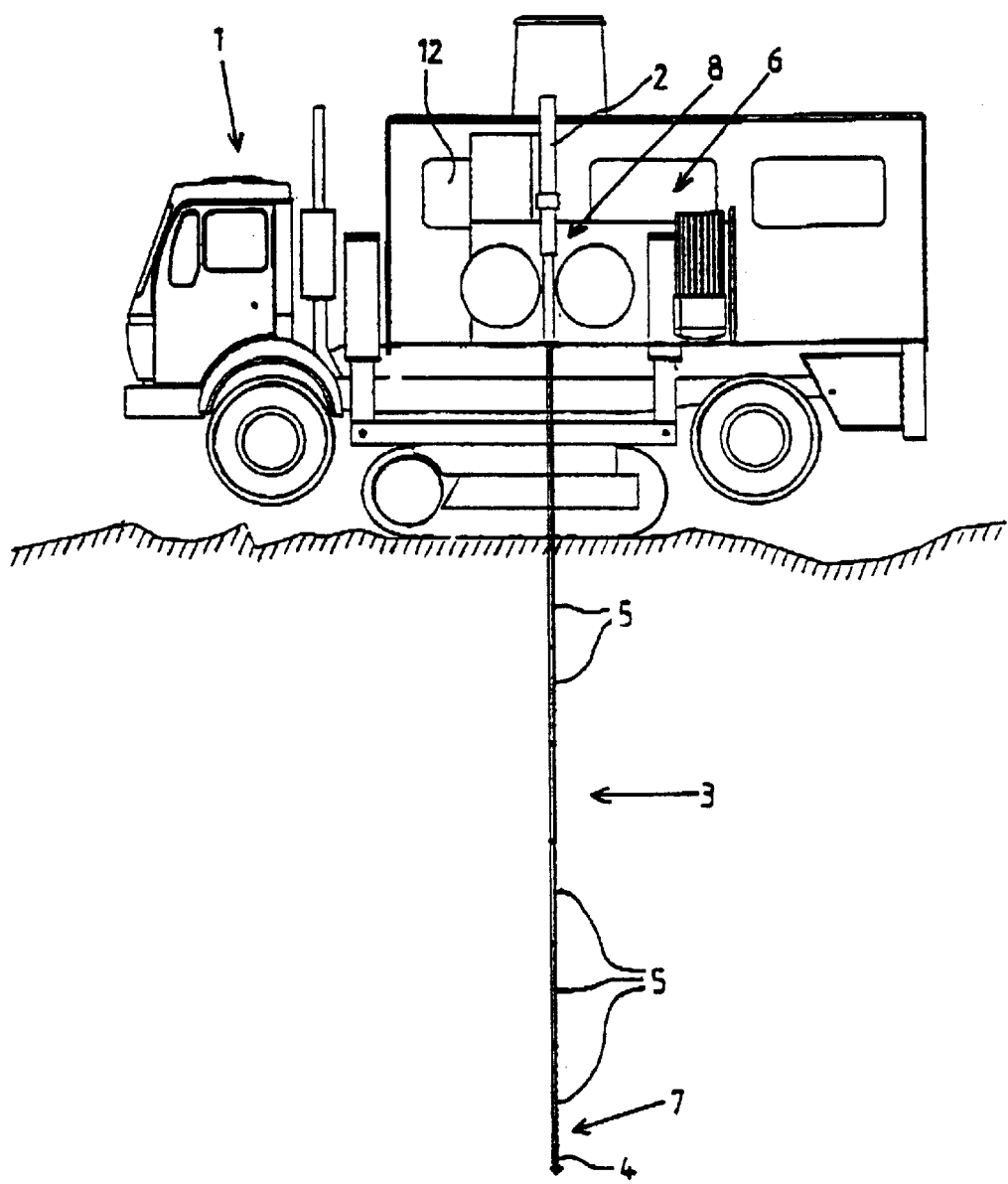
FIG. 1 schematically shows a soil probing operation by means of a specific example of a soil probing device according to the invention.

FIG. 1 shows a vehicle 1 on which a probing rod drive mechanism 2 has been positioned which is able to exert a downward force on a probing rod 3 in order thus to push the probing rod 3 into the soil. At the same time, the drive mechanism 2 can serve to pull the rod 3 back up from the soil. Disposed at the lower end of the probing rod 3 is a measuring probe 4.

During the probing operation, the probing rod 3 is assembled from the rod sections 5 which can be axially linked together, a supply of said rod sections being stored in a magazine 6. Each time the probing rod 3 has been pushed into the soil by a certain distance, the rod 3 is extended at the top by another rod section 5. The rod sections 5 have a length, for example, of between 1 and 2 metres, so that many sections 5 will be linked to one another in the case of a customary probing depth of between 10 and 30 metres. In a practical embodiment the rod sections 5 can be linked by screwthreads on the ends thereof or a similar detacheable fastening.

The probe 4 is provided with measuring means (not shown) for obtaining soil data. For example, the measuring probe 4 is a standard cone penetrometer with a cone and an associated dynamometer for measuring the cone resistance when the probing rod 3 is pushed into the soil.

The soil probing device further comprises data transmission means for transmitting soil data obtained by the measuring probe 4 to a location at or near the soil surface, in this case to processing and recording apparatus 12 mounted in the vehicle 1.

The data transmission means comprise transmitter means 7 which are located next to the measuring probe 4 and are designed for feeding data to a guide for transmitting the data to the apparatus 12 in the vehicle 1. Located next to the top end of the probing rod 3 are receiver means 8 which are designed for receiving data transmitted by the transmitter means via the guide.

Transmission of the data in this case makes use of an optical guide in the probing rod 3. To this end, each rod section 5 is provided with a optical guide section (not shown) extending between the axial ends of the probing rod section 5 in such a way that linking a plurality of rod sections 5 results in the formation of a continuous optical guide within the probing rod 3. Additionally, the transmitter means and receiver means 7, 8 are designed for optical data transmission. It proves possible to move the sections of the optical guide towards one another so that their heads are close together or abut against each other, in order thus to achieve transmission of the optical signal from the one optical guide section to the next optical guide section. Optionally, lenses are provided at the junctions of the optical guide sections, i.e. at the axial ends of the rod sections 5, to achieve reliable signal transmission. The optical guide sections can be made of glass or plastic and may have the shape of one or more relatively thick rods inside the probing rod which is usually made of metal, or be in the form of a thin glass fiber, optionally a bundle of glass fibers.

As described previously, the probing rod 3 is extended at regular intervals during the probing operation. As the receiver means 8 are located near the top end of the topmost rod section 5, the optical link is temporarily broken when a new rod section 5 is linked up. The drive mechanism 2 is preferably of a type which allows the probing operation to be continued while a new section is being linked up, so that the probing rod 3 will be pushed further and further into the soil. To prevent measuring data measured by the probe 4 from being lost while a rod section 5 is being linked up, owing to the break in the optical guide, provision is preferably made for the transmitter means 7 to comprise a memory which in this case of such design that during a probing operation all the measured data are stored and that they can be read after the probing rod 3 and the probe 4 have been pulled back out from the soil. This allows the data which have not been received during the breaks in the transmission nevertheless to be incorporated in the results of the measurements. In one version, the memory is of such design that measurement data transmitted via the guide are also stored temporarily in a memory located next to the transmitter means 7 and the transmission of these data is repeated once or a number of times at a later time, so that measurement data which have become available during link-up of a rod section—and the attendant break in the optical guide—will still be transmitted. To ensure that all this will function reliably, provision can be made for a time indication corresponding to the time at which the data were measured to be appended to the measurement data. Using these data it is therefore possible, in a simple manner, to obtain a continuous series of measurement data without any gaps.

It will be obvious that the optical guide can also be used for transmission in the opposite direction, i.e. from the surface to the measuring probe 4, for example to control operation of the probe 4 or in order to implement a specific communication protocol between probe 4 and recording apparatus 12.

It is also possible for a plurality of parallel optical guides to be provided in the sections 5 of the probing rod 3, so that different data can be transmitted each via a separate guide. In view of the large signal transmission capacity of a single optical guide, it will, however, usually be possible in practice to manage with a single optical guide.

Figure 2:
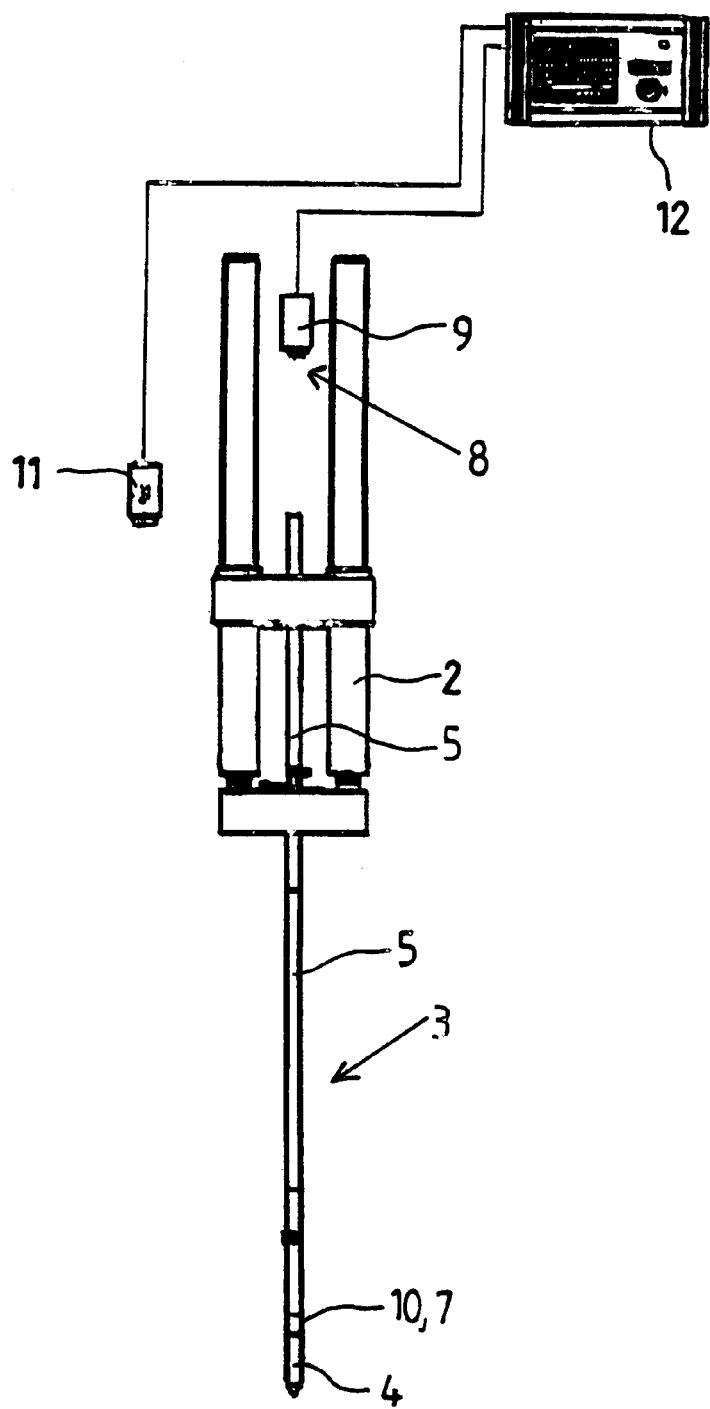
FIG. 2, in a diagram, shows the relevant components of a preferred embodiment of the soil probing device according to the invention.

FIG. 2 shows in more detail the relevant components of the device of FIG. 1. In FIG. 2, reference numeral 2 indicates a known drive mechanism by means of which the probing rod 3 can be pushed into the soil.

The transmitter means 7 preferably comprise a circuit for conditioning the electrical signals emitted by the measuring probe 4 and for converting these analog signals into digital signals. The transmitter means 7 further comprise an optical transmitter and in this case also an optical receiver for transmitting and receiving optical signals which may or may not be visible to the eye, and comprise digitized data or control commands. Also provided next to the transmitter means 7 is the previously discussed memory. Control of the electronic components and the memory is managed by an associated microprocessor.

The transmitter means 7 are preferably accommodated in an associated transmitter rod section 10 which preferably, at one of its ends, can be detachably linked to the probe 4 and at its other end can be detachably linked to a rod section 5 which is provided with a optical guide section. In addition, a supply circuit for the measuring probe 4 is preferably provided within the transmitter rod section 10.

Additionally accommodated, by preference, in said transmitter rod section 10 or in a separate rod section which can be linked thereto, is a rechargeable or replaceable electrical battery to provide the electrical energy for the abovementioned transmitter means 7 and possibly for the measuring probe 4.

In a further version, provision can be made for one or more optical amplifiers to be used in the stage between the transmitter means 7 and the receiver means 8. Preferably, separate probing rod sections are provided in which an optical amplifier is accommodated. In practice, such an amplifier section can then, for example, be positioned every 8–12 meters in the probing rod 3 between the rod sections 5. Preferably, each amplifier section is provided with its own electrical (rechargeable) battery.

In FIG. 2 it can also be seen that the receiver means 8 are not fastened to the top end of the probing rod 3, although this would be within the scope of the application, but that provision is made for contactless transmission of the measurement data from the head of the probing rod to the recording apparatus 12. To this end, the receiver means 8 are located at a distance above said probing rod 3 on an associated mount. The receiver means 8 in this case comprise a camera 9 which is pointed to and focused on the head of the optical guide in the topmost section 5 of the probing rod 3. In a possible embodiment, said camera 9 is mounted so as to be stationary and is provided with automatic camera focusing which adjusts the camera 9 each time the head of the probing rod 3 is shifted during probing. A system of one or more lenses can be provided with the camera 9.

Preferably, the camera 9 is mounted in such a position that it can remain in place when another section 5 is linked to the top of the probing rod 3. The camera 9 in this case is linked to a processing unit which converts the optical signals received and outputs them to recording apparatus 12 not described in any detail.

As mentioned earlier, the optical guide in the probing rod 3 can also be used for downward transmission of signals. This could, for example, be a control command in order to actuate or switch off the measuring probe 4 and/or any amplifier(s) present, or to control operation thereof. In FIG. 2, an optical transmitter unit 11 can be seen which, whenever a control command is to be sent to the measuring probe 4, is held at or above the top of the probing rod 3 and is able to emit an optical signal to the optical guide in the probing rod 3. In a possible embodiment, said transmitter unit, after the command has been transmitted, is removed again, so that the head of the probing rod 3 becomes visible to the camera 9. The transmitter unit 11 can, for example, be sufficiently small to be hand-held.

It will be evident that the camera 9 can also be mounted at a location other than that straight above the probing rod 3, particularly if use made of suitable lenses and/or reflectors to pass the optical signal from the head of the probing rod 3 to the camera 9.

In a possible version, the optical receiver means 8 are, however, positioned directly on top of the probing rod 3, for example in the form of a handy unit which can readily be releasable positioned on the head of the probing rod 3. In a possible embodiment provision is made for the optical signals received to be converted in that unit into radio signals which can be transmitted without the use of wires, so that the data can be transmitted from said optical receiver means 8, via a telemetry system, to the recording apparatus 12. When a new rod section is being linked up, it is then only necessary for that unit to be temporarily detached and to be placed on top of the newly linked-up rod section.

What is claimed is:

1. A soil probing device comprising a probing rod including a plurality of linkable rod sections, which probing rod, while being pushed into the soil, is extendable each time by one or more rod sections, said soil probing device further comprising a measuring probe which is fitted to the probing rod and is provided with measuring means to obtain data regarding the soil, and said soil probing device further comprising data transmission means which are designed for transmission of data between the measuring probe and a location at or near the soil surface, said data transmission means comprising transmitter means which are located next to or near the measuring probe and are designed for feeding data to an optical guide within the probing rod for the optical transmission of the data to receiver means which are located at or near the soil surface and are designed for receiving data optically transmitted by the transmitter means, wherein each rod section is provided with an optical guide section extending essentially between the ends of the rod section so that linking such rod sections results in the formation of a continuous optical guide within the probing rod.

2. A soil probing device according to claim 1, wherein the transmitter means comprise memory means for storing measurement data.

3. A soil probing device according to claim 2, wherein the memory means are designed to store all the measurement data measured during a probing operation.

4. A soil probing device according to claim 1, wherein the transmitter means comprise memory means for storing measurement data, and wherein the memory means are of such design that measurement data transmitted via the optical guide are also stored temporarily.

5. A soil probing device according to claim 1, wherein one or more rod sections are designed as an amplifier probing rod section containing an optical amplifier for amplifying an optical signal transmitted via said optical guide within the probing rod.

6. A soil probing device according to claim 1, wherein one or more rod sections are designed as an amplifier probing rod section containing an optical amplifier for amplifying an optical signal transmitted via said optical guide within the probing rod, and wherein each amplifier probing rod section is provided with an associated electrical battery.

7. A soil probing device according to claim 1, wherein the receiver means are designed for contactless transmission of the signals transmitted by the optical guide from the top of the probing rod.

8. A soil probing device according to claim 1, wherein the receiver means comprise a camera which is mounted at a distance from the probing rod and is designed for receiving optical signals arriving near the end of the optical guide.

9. A soil probing device according to claim 1, wherein the receiver means comprise a camera which is mounted at a distance from the probing rod and is designed for receiving optical signals arriving near the end of the optical guide, and wherein a mobile transmitter unit is provided for transmitting optical signals, said transmitter unit being designed for being placed temporarily above or on the end of the probing rod.

10. A soil probing device according to claim 1, wherein the transmitter means are accommodated in an associated probing rod section.

11. A soil probing device according to claim 1, wherein an electrical battery is provided in a probing rod section in order to feed the transmitter means and possibly the measuring probe.

12. A probing rod section designed for assembling a probing rod from a plurality of probing rod sections for the purpose of pushing a probe into the soil, wherein the probing rod section is provided with an optical guide, which extends between the axial ends thereof, for optical data transmission from the probe to the surface.

13. A method for performing a soil probing operation using a soil probing device formed from a plurality of linkable rod sections, which probing rod, while being pushed into the soil, is extendable each time by one or more rod sections, said soil probing device further comprising a measuring probe which is fitted to the probing rod and is provided with measuring means to obtain data regarding the soil, and said soil probing device further comprising data transmission means which are designed for transmission of data between the measuring probe and a location at or near the soil surface, said data transmission means comprising transmitter means which are located next to or near the measuring probe and are designed for feeding data to an optical guide within the probing rod for the optical transmission of the data to receiver means which are located at or near the soil surface and are designed for receiving data optically transmitted by the transmitter means, wherein each rod section is provided with an optical guide section extending essentially between the ends of the rod section so that linking such rod sections results in the formation of the continuous optical guide within the probing rod.

* * * * *